United States Patent
Paden et al.

(10) Patent No.: US 8,646,051 B2
(45) Date of Patent: *Feb. 4, 2014

(54) AUTOMATED PASSWORD RESET VIA AN INTERACTIVE VOICE RESPONSE SYSTEM

(75) Inventors: Jonathan Paden, Austin, TX (US); Bobby Sams, Austin, TX (US); Kurt M. Joseph, Austin, TX (US); Donna McCaffrey, Stony Point, NY (US); Jon Harris, Little Elm, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 764 days.

This patent is subject to a terminal disclaimer.

(21) Appl. No.: 10/937,961

(22) Filed: Sep. 10, 2004

(65) Prior Publication Data

US 2006/0059362 A1  Mar. 16, 2006

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC ............................................. 726/5; 713/184

(58) Field of Classification Search
None
See application file for complete search history.

(56) References Cited

U.S. PATENT DOCUMENTS

| | | | | |
|---|---|---|---|---|
| 5,329,578 A * | 7/1994 | Brennan et al. | ........... | 379/211.03 |
| 5,953,700 A * | 9/1999 | Kanevsky et al. | ......... | 704/270.1 |
| 6,016,476 A * | 1/2000 | Maes et al. | ........................ | 705/1 |
| 6,240,174 B1 * | 5/2001 | Silver | ............................. | 379/230 |
| 6,311,272 B1 * | 10/2001 | Gressel | .......................... | 713/186 |
| 6,400,805 B1 * | 6/2002 | Brown et al. | .............. | 379/88.01 |
| 6,438,601 B1 * | 8/2002 | Hardy | ........................... | 709/229 |
| 6,625,258 B1 | 9/2003 | Ram et al. | | |
| 6,968,050 B1 * | 11/2005 | Pershan et al. | ................ | 379/196 |
| 6,973,575 B2 * | 12/2005 | Arnold | .......................... | 713/186 |
| 7,292,680 B1 * | 11/2007 | Simpson | .................... | 379/88.18 |
| 7,302,292 B2 * | 11/2007 | Ginor | ............................ | 600/547 |
| 2002/0147914 A1 * | 10/2002 | Arnold | .......................... | 713/186 |
| 2002/0173956 A1 * | 11/2002 | Hartley et al. | ................ | 704/231 |
| 2003/0004751 A1 * | 1/2003 | Ng et al. | .......................... | 705/2 |
| 2003/0026413 A1 * | 2/2003 | Brandt et al. | ................. | 379/230 |
| 2003/0048890 A1 * | 3/2003 | Weiss et al. | ............. | 379/201.02 |
| 2003/0229492 A1 | 12/2003 | Nolan | | |
| 2004/0017898 A1 | 1/2004 | Reynolds | | |
| 2004/0196966 A1 * | 10/2004 | Bushnell | ..................... | 379/88.19 |
| 2004/0203595 A1 * | 10/2004 | Singhal | ......................... | 455/411 |
| 2006/0059361 A1 * | 3/2006 | Paden et al. | .................... | 713/184 |

OTHER PUBLICATIONS

Microsoft TechNet, "Creating a Strong Password Policy," Mar. 28, 2003, p. 2.*
Williamson, Marcus "Implementing Strong Passwords in an NDS Environment," Aug. 1, 2000, p. 2.*
Hubris Communications, inc., "Vulgar Language Policy"(c) 2003, p. 1.*

* cited by examiner

*Primary Examiner* — Nadia Khoshnoodi
(74) *Attorney, Agent, or Firm* — Greenblum & Bernstein, P.L.C.

(57) ABSTRACT

A method for resetting Internet access account passwords can include the step of connecting a user with an interactive voice response system (IVR). At least one access account associated with the user can be determined. The IVR can validate that the user is authorized to access the access account. The IVR can then cause a password associated with the at least one access account to be reset. The IVR can also present the reset password to the user.

18 Claims, 2 Drawing Sheets

US 8,646,051 B2

AUTOMATED PASSWORD RESET VIA AN INTERACTIVE VOICE RESPONSE SYSTEM

BACKGROUND

1. Field of the Invention

The present invention relates to the field of networking and, more particularly, to resetting account passwords using an Interactive Voice Response System.

2. Description of the Related Art

Internet service providers (ISPs) connect users to the Internet in a variety of manners, such as dial-up, digital subscriber line (DSL), cable, satellite, or the like. Regardless of the connection methodology, a user can be required to provide a user identifier and an associated password before being granted access to the ISP's services. User identification allows the ISP to provide user-specific services, like e-mail, news groups, chatting, instant messaging, or the like. Passwords assure that the present user is authorized to access the identified account.

Often, an ISP will provide a subscribing user access to the Internet via multiple different access accounts for a single subscription charge. The different access accounts are provided so that multiple household members can each be provided with different user-specific services. For example, each household member can have a different e-mail address unique to the household member. Each of the multiple access accounts can be associated with a unique user identifier and user password.

When the ISP provides a subscriber with multiple accounts for a single fee, one account is generally designated as a primary account and the other accounts designed as sub-accounts, also called aliases. All subscription identification information can be associated with the primary account. Further, the primary account can be authorized to alter access privileges of any of the sub-accounts, but the sub-accounts can be authorized only to make user specific changes that affect that sub-account. These changes to the sub-account must be consistent with restrictions established by the primary account.

Users sometimes lose or forget passwords associated with the primary account and/or one or more of the sub-accounts. The likelihood that passwords will be forgotten increases when the ISP utilizes security enhancing techniques to prevent unauthorized users from guessing passwords. Security enhancement techniques can require a minimum password length, can require a password to include both letters and numbers, can disallow dictionary entries as passwords, can cause passwords to periodically expire, or the like.

When users forget their passwords, the associated password must be reset Conventional automated password reset mechanisms, which are primarily Web based, can require Internet access, which a user who has forgotten their account password often lacks.

Another way that a user can reset a password is through a customer service representative. Customer service centers, however, are generally minimally staffed to reduce costs. Minimally staffing a customer service center can result in frustratingly long wait times. Additionally, a customer service center may be only manned during daytime hours, even though many dial-up subscribers use the dial-up services outside those hours. Consequently, subscribers can be forced to wait a significant time after a problem with their password has been discovered, before that problem can be resolved. Further, the sheer volume of customer service calls to reset passwords, which can account for approximately a fourth of total call volume, can significantly impact the manning requirements of the customer service center. A secure user-friendly means of automating password resets would permit ISP call centers to be operated with fewer live agents while providing customers with increased support.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

The present invention provides a system, a method, and an apparatus for automatically resetting passwords associated with Internet Service Provider (ISP) access accounts using an Interactive Voice Response system (IVR). The IVR can determine an access account associated with the caller. In one embodiment, the determination can be automatically performed by comparing user caller identification information with information contained within a subscriber database. In another embodiment, the IVR can prompt a user to identify an access account. The IVR can validate that the user is authorized to access the account. After validation, the IVR can cause the password associated with an identified user account to be reset to a randomly generated password. The randomly generated password can be audibly presented to the user via the IVR. Further, a notification of the password change can be conveyed to one or more e-mail addresses, such as the e-mail address associated with the access account and/or a supervisory account. Consequently, a user can be quickly provided with a reset password without requiring the assistance of a human customer service agent.

Figure 1:
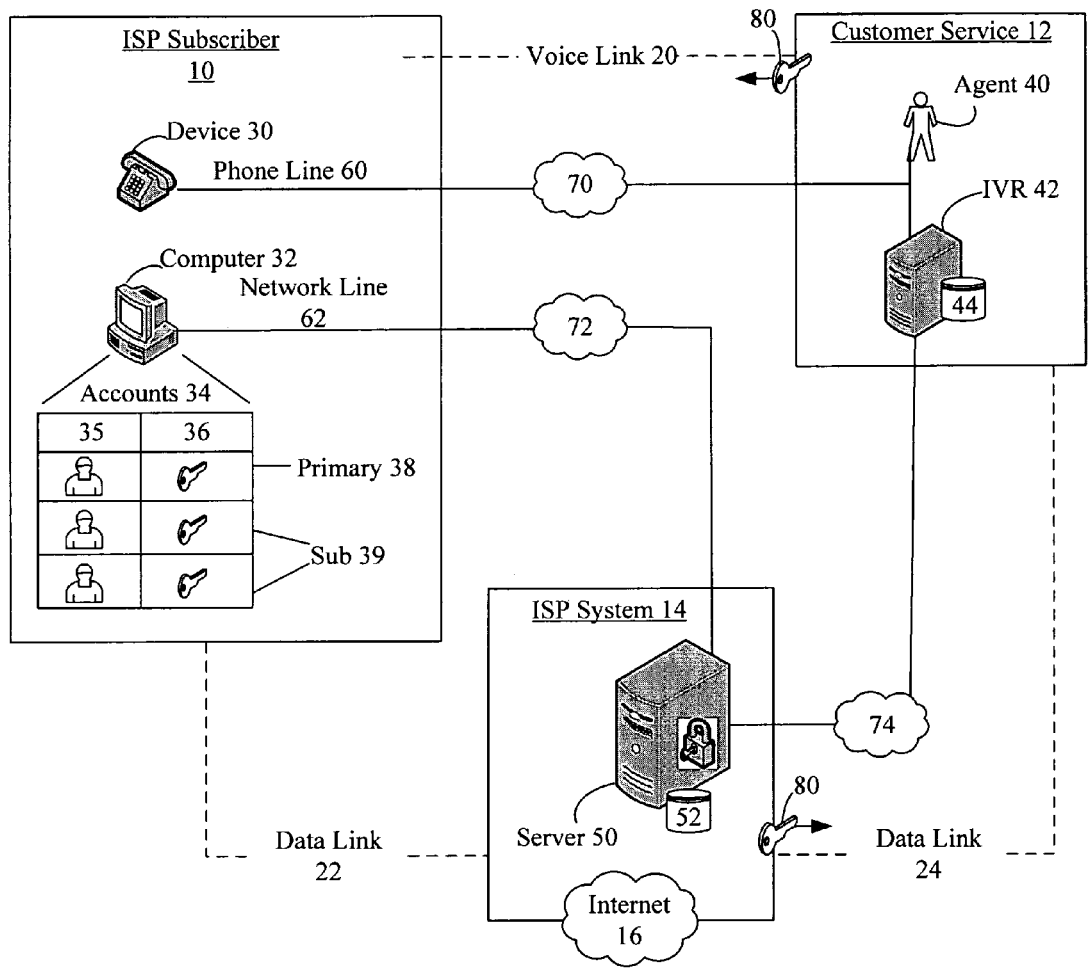
FIG. 1 is a schematic diagram of a system for automatically resetting account passwords via an interactive voice response system in accordance with an embodiment of the inventive arrangements disclosed herein.

FIG. 1 is a schematic diagram of a system 100 for automatically resetting passwords via an IVR 42 in accordance with an embodiment of the inventive arrangements disclosed herein. The system 100 can include an ISP subscriber 10, a customer service center 12 and an ISP system 14. The ISP system 14 can grant Internet 16 access to the ISP subscriber 10. The customer service center 12 can be granted permission to reset passwords within the ISP system 14. The ISP subscriber 10 can use the customer service center 12 as a means for interfacing with the ISP system 14 so that ISP account passwords can be reset responsive to user requests.

ISP subscriber 10 can establish a voice link 20 with the customer service center 12. The voice link 20 can be a standard public switched telephone network (PSTN) connection, which is typically a circuit-switched connection. The voice link 20 is not limited in this regard, however, and a packet-based connection that utilizes a technology like Voice over Internet Protocol (VoIP) can also form the voice link 20.

In one embodiment, the voice link 20 is formed when the device 30 connects to the customer service center 12 through a phone line 60. The device 30 can be any of a variety of customer premise equipment (CPE) devices, such as a touch-tone telephone. The phone line 60 can be a land-based line, such as a twisted pair telephone line. The device 30 and the phone line 60 are not to be limited in this regard, however, and any suitable equipment and connectivity pathway can be utilized herein. For example, the device 30 can include a video teleconferencing station, mobile telephone, a two-way radio, or the like. The phone line 60 can include any type of physical communication line as well as equipment, such as transducers, transmitters, receivers, repeaters, or the like, for establishing a wireless communication pathway.

The ISP subscriber 10 can connect a computer 32 to the ISP system 14 and responsively receive Internet access 16 via a data link 22. The computer 32 can be any communication device capable of Internet access, including a personal computer, a data tablet, a smart phone, a personal data assistant (PDA), an embedded device, or the like. The data link 22 can be any connection that permits packetized information to be conveyed between the computer 32 and the server 50 or between the computer 32 and other ISP system 14 component.

In one embodiment, the data link 22 is formed when the computer 32 connects to the ISP system 14 through a network line 62. The network line 62 can be physically identical to the phone line 60, which is often the situation when the ISP system 14 provides dial-up service and/or DSL service. The network line 62 can also be physically separate from the phone line 60, such as when the network line 62 is a coaxial cable line for cable network connectivity or a dedicated telephony line for integrated services digital network (ISDN) service. The network line 62 can also be a wireless "line" such as a satellite link a Wireless Fidelity (WIFI) connection link, and/or mobile telephony link.

Users of the computer 32 can access the Internet 16 using one or more authorized access accounts 34. Each of the access accounts 34 can have a user identifier 35 and an associated password 36.

In one embodiment, one of the accounts 34 can be considered the primary account 38. Other ones of the accounts 36 can be considered sub-accounts 39. The primary account 38 can have supervisory authority over the sub-accounts 39.

The customer service center 12 can include one or more live agents 40 and the WR 42. The IVR 42 can direct the ISP subscriber 10 to the agent 40 whenever an attempt to automatically service the ISP subscriber 10 fails. The IVR 42 can be configured as an interface through which ISP subscriber 10 is permitted to reset one or more of the passwords 36. The IVR 42 can be communicatively linked to data store 44, which can be used to log ISP subscriber 10 requests, to store ISP subscriber 10 specific data, or the like.

The customer service center 12 can be connected to the ISP system 14 via data link 24. Data link 24, like data link 22, can be any connection that permits packetized information to be conveyed. The conveyance of the data can occur between IVR 42 and server 50 via network 74.

The ISP system 14 can include hardware and/or software necessary to connect ISP subscribers 10 to the Internet 16. The ISP system 14 can include an access account server 50 that authorizes Internet 16 access based upon an access account number and a corresponding password. The access account server 50 can store account specific data in data store 52. The account specific data can include identification information, usage information, payment information, or the like pertaining to access accounts 34. The access account server 50 can also permit authorized administrators and/or the IVR 42 to reset account passwords. The resetting of a password can involve setting a password to a default value as well as randomly generating a new password.

In operation, the ISP subscriber 10 can realize that password 36 for accessing account 35 has been lost or forgotten. The ISP subscriber 10 can place a telephony call to the IVR 42 using device 30. The IVR 42 can attempt to automatically identify the ISP subscriber 10 from caller identification information present in the call. The IVR 42 can also prompt the ISP subscriber 10 for caller identification data. Once the IVR 42 has identified a valid access account for the ISP system 14, the IVR 42 can prompt the calling ISP subscriber 10 for verification information to verify that the caller is authorized to reset the password. Received verification information can be compared against data within the data store 52. If the IVR 42 is unable to automatically identify and/or verify an access account, the call can be re-routed to agent 40.

After verification, the IVR 42 can convey a password reset command across network 74 to the access account server 50. The access account server 50 can responsively generate a new password 80, which replaces the forgotten password. The password 80 can be conveyed over the data link 24 to the IVR 42. The IVR 42 can then audibly present the new password 80 to the ISP subscriber over voice link 20. The ISP subscriber can utilize the password 80 to access the ISP system 14 via data link 22, which in turn grants the ISP subscriber 10 access to the Internet 16.

Additionally, a notification that the new password 80 has been generated can be e-mailed to an accessible e-mail account. For example, a notification that a password reset operation has occurred for a sub-account 39 can be e-mailed to the e-mail address of the primary account 38. In one embodiment, the notification can include the new password so as to permit the primary account 38 owner to retain access to the sub-account 39 for which the password reset operation has occurred. Password notification options can be configured by an authorized user. Moreover, in certain embodiments, the primary account 38 owner can configure permissions for all associated sub-accounts 39, thereby permitting users of particular ones of the sub-accounts 39 to reset associated passwords and not permitting the resetting of passwords for other sub-accounts 39.

It should be noted that networks 70, 72, and 74, and 16 can be implemented as any of a variety of fashions so long as content is conveyed using encoded electromagnetic signals. Further, any of a variety of communication devices, such as customer premise equipment (CPE), computers, modems, routers, switches, or the like, can be included within networks 70, 72, 74, and 16.

Each of the networks 70, 72, and 74 can convey content in a packet-based or circuit-based manner. Additionally, each of the networks 70, 72, and 74 can convey content via landlines or wireless data communication methods. For example, each of the networks 70, 72, and 74 can separately include an Intranet, a local area network, a wide area network, or a combination thereof. In another example, each of the networks 70, 72, and 74 can include a telephony network, like a mobile wireless network or a public switched telephone network (PSTN).

The data stores 44 and 52 can store information in any recording medium, such as a magnetic disk, an optical disk, a semiconductor memory, or the like. Further, each of the data stores 44 and 52 can utilize any information retention technique including a file-based storage technique or a database storage technique. Moreover, each of the data stores 44 and 52 can be a storage area fixed to a geographical location or a storage area distributed across a network space.

It should be appreciated that the arrangements shown in FIG. 1 are for illustrative purposes only and that the invention is not limited in this regard. The functionality attributable to the various components can be combined or separated in different manners than those illustrated herein. For instance, the server 50 can be implemented as a plurality of communicatively linked computing devices.

Figure 2:
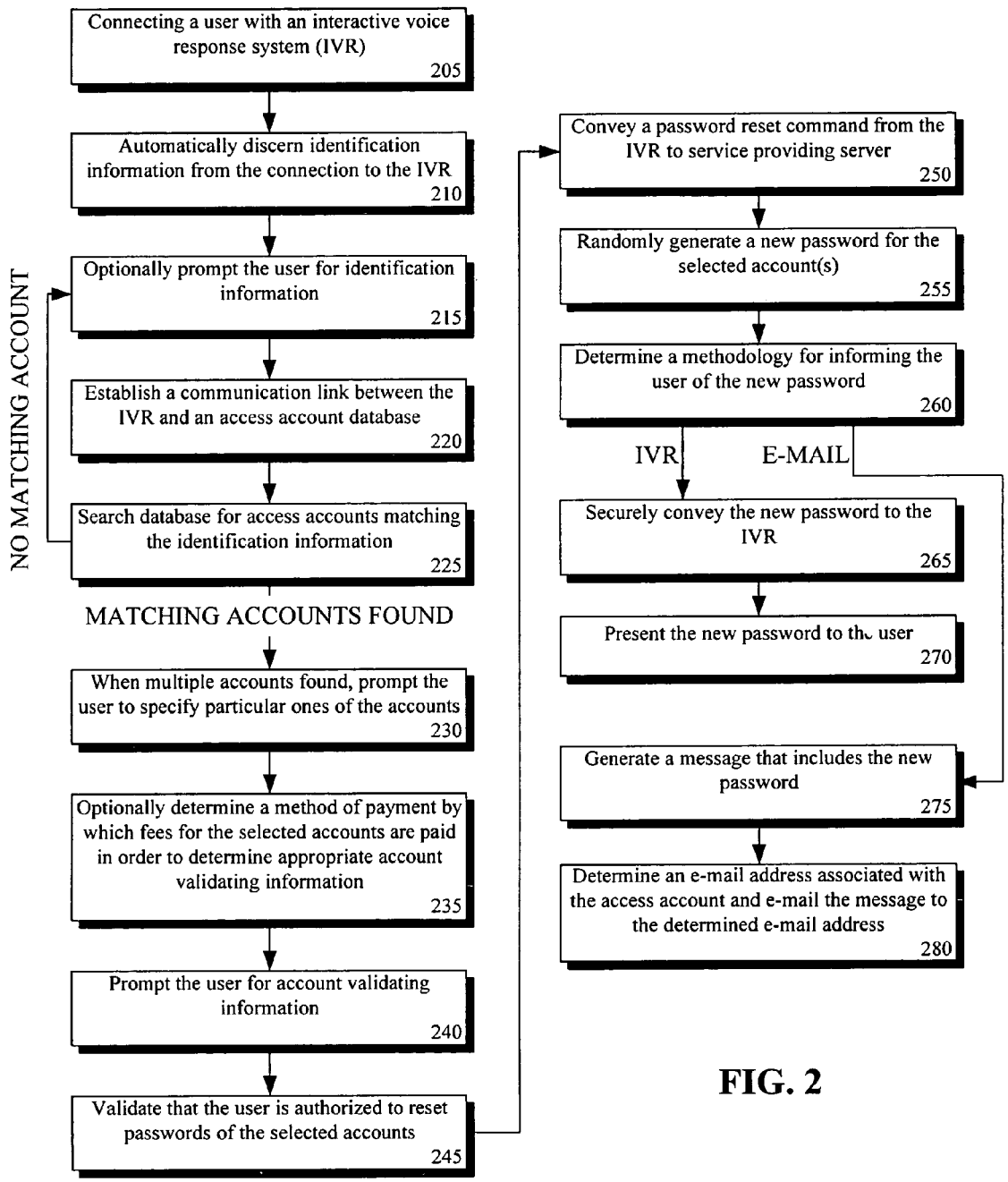
FIG. 2 is a flow chart of a method for automatically resetting account passwords via an interactive voice response system in accordance with an embodiment of the inventive arrangements disclosed herein.

FIG. 2 is a flow chart of a method 200 for automatically resetting account passwords via an IVR in accordance with an embodiment of the inventive arrangements disclosed herein. The method 200 can be performed in the context of any of a variety of computing environments where a service provider grants Internet access to users. For example, the method 200 can be performed in the context of the system 100 of FIG. 1.

The method 200 can begin in step 205, where a user can be connected with an IVR system. In step 210, the IVR system can automatically discern identification, information from the telephone connection. For example, caller identification information such as a caller's telephone number, address, and/or name can be automatically determined from information transmitted within the telephony channel when the call to the IVR is established. In step 215, the user can be optionally prompted for identification information. In one embodiment, the user prompted information can be used to confirm the correctness of the automatically generated identification information.

In step 220, a communication link can be established between the IVR and an access account database. The access account database can be maintained by the Internet Service Provider that provides dial-up services and/or by the IVR for password resetting purposes. In step 225, the database can be searched for access accounts matching the identification information. When no matching accounts are found, the method can loop back to step 215, where the user can be prompted for additional identification information.

When matching accounts are found, the method can proceed to step 230. In step 230, when multiple accounts are found, the user can be prompted to specify particular ones of the accounts for which passwords are to be reset. Notably, an authorized user of a primary account can specify the resetting of sub-account passwords, the primary account password, and/or any combination thereof. An authored user of a sub-account can be restricted to resetting only that sub-accounts passwords. In one embodiment, when a sub-account user resets the corresponding sub-account password, a notification can be sent to the primary account.

In step 235, a method of payment by which fees for the selected accounts are paid can be optionally determined. Different methods of payment can alter what validation information is needed to determine whether a caller is authorized to reset account passwords. For example, when the method of payment is a credit card, a credit card number or the last 4 digits of the credit card number can be used as validation information. When the method of payment is check, the routing number of the checking account and last payment check number can be used as validation information. Subscription account numbers, social security numbers, previously established answers to questions, or the like can also be used as validation information.

In step 240, the user can be prompted for the account validating information, as appropriate in light of step 235. In step 245, the IVR can validate that the user is authorized to reset passwords of the selected accounts based upon received validation information. In step 250, a password reset command can be conveyed from the IVR to a server associated with the service provider. In step 255, a new password for the selected account(s) can be randomly generated. The password can be generated by the server, by the IVR, and/or by any other computing device. The selected user account(s) can be associated with the generated password.

In one embodiment, the password can consist of a known number of randomly generated numbers and/or letters. The user can be informed of the number of digits in the password to ensure accurate conveyance. For example, the generated password can consist of three randomly generated letters followed by three randomly generated numbers. A prompt informing the user of the format of a password can be audibly presented to the user before the password is presented along with an option to have the password audibly repeated. Further, to prevent confusion, potentially ambiguous or similarly sounding letters can be excluded for password generation purposes. That is, letters like "B", "G", and "D" may be excluded as they often sound similar, especially when presented to a listener over a low-quality communication pathway. Moreover, safeguards can be built into the password generation algorithm to ensure that potentially offensive passwords, such as profanities, are not randomly generated.

In step 260, a methodology for informing the user of the new password can be determined. In one embodiment, the password conveyance methodology can be automatically determined by the IVR based upon security precautions. For example, the password can be presented to the user by the IVR whenever there is an extremely high confidence that the calling user is an authorized user. When a lower confidence exists, however, the password and/or password change notification can be conveyed to the caller through a more secure means, such as e-mail, postal mail, or some other notification mechanism. When the confidence level is below a set threshold, a user may be required to speak with a customer service representative before the password reset operation is permitted.

When the IVR presents the password, the method can proceed to step 265, where the new password can be security conveyed from the server to the IVR. Notably, such a conveyance is not necessary in arrangements where the IVR generates the new password. In step 270, the password can be audibly presented to the user by the IVR.

When a notification of the password reset is conveyed to the user via e-mail, the method can proceed from step 260 to step 275, where an electronic message that includes the notification can be generated. In one embodiment, this notification can include the newly generated password. In step 280, an e-mail address associated with the access account can be determined. The message can be e-mailed to the determined e-mail address. It should be appreciated that multiple password conveyance mechanisms can be used. For example, whenever a sub-account user alters a password, a password change notification can be conveyed to an e-mail account associated with the primary account.

The password change notification can include a message that the recipient should change the newly generated password to a user specified one. The message can specify a time period in which the password must be changed. Further, the message can provide a link to a Web site that enables the user to reset the password. The message can also provide customer support contact information, so that the recipient can inform an agent of the Internet Service Provider whenever an unauthorized user has attempted to reset a password, thereby enabling the ISP to identity intrusion attempts.

The steps detailed within method 200 represent one illustrative embodiment of the inventive arrangements disclosed herein. The scope of the invention is to be construed as including adaptive deviations of the method 200 that are essentially the same as steps detailed herein. For example, in one such deviation, the IVR can be configured for heightened security so as to only permit passwords to be automatically reset when calls originate from previously verified telephone number, such as a telephone number from which the last successful dial-up connection originated. This telephone number can be looked-up by querying the service provider's information database.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for resetting dial-account passwords, comprising:
    connecting, using a telephony network account, a user with an interactive voice response system (IVR) over a telephony network;
    determining, using a server over a data network separate from the telephony network, at least one dial-up Internet access account required for a computer used by the user to access the Internet, separate from the telephony network account, and associated with the user, wherein the dial-up Internet access account is used by the user to access the Internet over a Public Switched Telephone Network;
    using the server for validating that the user is authorized to access the at least one dial-up Internet access account;
    generating, by the server, a new password from a group of letters that excludes similar sounding letters in the new password to assist the user in audibly discerning the new password, the generation of the new password and the exclusion of the similar sounding letters when generating the new password being independent of an existing password;
    resetting the existing password of the at least one dial-up Internet access account with the new password;
    providing the new password of the at least one dial-up Internet access account to the user over the telephony network using the IVR, and
    e-mailing the new password to an e-mail address for the Internet access account registered prior to connecting the user with the IVR,
    wherein access to the Internet using the at least one dial-up Internet access account is controlled in accordance with the new password.

2. The method of claim 1,
    wherein the at least one dial-up Internet access account comprises a plurality of dial-up Internet access accounts consisting of a primary access account and at least one sub-account, and
    wherein the new password is generated randomly.

3. The method of claim 2,
    wherein the validating identifies one of the at least one sub-account,
    wherein the resetting resets a password for the identified sub-account, and
    wherein a password of the primary access account is not reset.

4. The method of claim 3,
    wherein the determining retrieves account data from an access account database of an Internet Service Provider,
    wherein the retrieved account data is linked to the primary access account and is not directly linked to the at least one sub-account.

5. The method of claim 3,
    wherein the primary access account selectively enables or disables permission for resetting the password of the at least one sub-account, and wherein the new password further excludes offensive passwords.

6. The method of claim 2,
    wherein the validating authorizes the user to access the primary access account,
    wherein the resetting automatically resets passwords for each of the plurality of dial-up Internet access accounts.

7. The method of claim 1,
    wherein the IVR automatically discerns identification information from signaling information supplied via the telephony network, the method further comprising:
    comparing the identification information against account data from an access account database; and
    based upon the comparing, automatically determining the at least one dial-up Internet access account.

8. The method of claim 1,
    wherein the determining further comprises:
    the IVR prompting the user for identification information;
    receiving the identification information from the user;
    comparing the identification information against account data from an access account database; and
    based upon the comparing, automatically determining the at least one dial-up Internet access account,
    wherein the prompting occurs responsive to a failed attempt to automatically determine the at least one dial-up Internet access account based upon discerned identification information received over the telephony network.

9. The method of claim 1, further comprising:
    the IVR receiving an e-mail address associated with the user,
    wherein the determining determines the at least one dial-up Internet access account based upon the e-mail address.

10. The method of claim 1, further comprising:
    after determining the at least one dial-up Internet access account, prompting the user for additional user identification information; and
    receiving the additional user identification information responsive to the prompting, wherein the validating comprises the IVR comparing the received additional user information against corresponding data associated with the at least one dial-up Internet access account.

11. The method of claim 10,
    wherein the additional user identification information required by the IVR system depends upon the method of payment by which fees associated with the at least one dial-up Internet access account are paid.

12. The method of claim 1,
wherein the resetting further comprises:
determining a confidence level from the validation;
preventing the resetting the password and connecting the user with a customer service representative responsive to the confidence level falling below a first threshold;
selecting a delivery mechanism for at least one among the reset password and a password change notification responsive to the confidence level exceeding the first threshold, wherein the delivery mechanism comprises one among:
audibly presenting the user the reset password by way of the IVR responsive to the confidence level exceeding a second threshold; and
conveying to the user at least one among the reset password and the password change notification over a secure mechanism of communications responsive to the confidence level falling below the second threshold but exceeding the first threshold.

13. The method of claim 1, further comprising:
generating a message including a password change notification; and
e-mailing the message to an e-mail account associated with the at least one dial-up Internet access account.

14. A non-transitory machine-readable storage having stored thereon, a computer program having a plurality of code sections, the code sections executable by a machine for causing the machine to perform:
determining, using a server over a data network, at least one dial-up Internet access account required for a computer used by the computer to access the Internet, wherein the user connects over a telephony network to an interactive voice response system (IVR) using a telephony network account separate from the dial-up Internet access account, and wherein the dial-up Internet access account is used by the user to access the Internet over a Public Switched Telephone Network;
validating, by the server, that the user is authorized to access the at least one dial-up Internet access account based upon data provided over the data network by the IVR;
generating, by the server, a new password that excludes similar sounding letters in the new password, the generation of the new password and the exclusion of the similar sounding letters when generating the new password being independent of an existing password;
resetting a password for accessing the at least one dial-up Internet access account;
providing the new password of the at least one dial-up Internet access account to the user over the telephony network using the IVR; and
e-mailing the new password to an e-mail address for the Internet access account registered prior to connecting the user with the IVR,
wherein the machine readable storage is disposed in the server,
wherein the IVR is configured to communicate with the user over the telephony network,
wherein access to the Internet using the at least one dial-up Internet access account is controlled in accordance with the new password, and
wherein the IVR is configured to communicate with the machine readable storage over the data network using a computer network connection.

15. The non-transitory machine readable storage of claim 14,
wherein the at least one dial-up Internet access account comprises a plurality of dial-up Internet access accounts consisting of a primary access account and at least one sub-account and wherein the password is generated randomly.

16. The non-transitory machine readable storage of claim 14,
wherein the IVR automatically discerns identification information from signaling information supplied over a telephony network between the user and the IVR and conveys the identification information to the machine readable storage, the code sections of the machine readable storage further causing the machine to perform:
comparing the identification information against account data from a dial-up Internet access account database; and
based upon the comparing, automatically determining the at least one dial-up Internet access account.

17. The non-transitory machine readable storage of claim 14,
wherein the validating depends upon the method of payment by which fees associated with the at least one dial-up Internet access account are paid.

18. The non-transitory machine readable storage of claim 14,
the code sections of the machine readable storage further causing the machine to perform:
randomly generating the password, wherein the randomly generated password excludes similar sounding letters;
associating the password with the at least one dial-up Internet access account;
conveying the password to the IVR so that the IVR can audibly present the password to the user.

* * * * *